United States Patent [19]

Imaya et al.

[11] Patent Number: 4,492,433
[45] Date of Patent: Jan. 8, 1985

[54] IN-FEM LIQUID CRYSTAL DISPLAY PANEL WITH A FILM OF CELLOPHANE TAPE

[75] Inventors: Akihiko Imaya; Susumu Kitamura, both of Nara, Japan

[73] Assignee: Sharp Kabushiki Kaisha, Osaka, Japan

[21] Appl. No.: 437,507

[22] Filed: Oct. 28, 1982

[30] Foreign Application Priority Data

Oct. 28, 1981 [JP] Japan .................. 56-161540[U]

[51] Int. Cl.³ .................................... G02F 1/133
[52] U.S. Cl. ........................ 350/339 R; 350/347 R
[58] Field of Search .................. 350/347 E, 339 R

[56] References Cited
U.S. PATENT DOCUMENTS
4,097,128 6/1978 Matsumoto et al. ....... 350/347 E X Primary Examiner—John K. Corbin
Assistant Examiner—David Lewis
Attorney, Agent, or Firm—Birch, Stewart, Kolasch & Birch

[57] ABSTRACT

A liquid crystal display panel comprises a pair of polarizers, the polarization axes of the polarizers being substantially orthogonal each other, a pair of substrates each supporting an electrode, a film provided between one of the substrates and one of the polarizers, the film having an optical axis inclined to the polarization axis of said one of the polarizers at about 45°, and a liquid crystal material disposed between the substrates, molecules of the liquid crystal material being twisted at about 90° between the surface of the substrates. The panel is adapted to provide a positive type display where the film is not positioned and the panel is adapted to provide a negative type display where the film is positioned.

2 Claims, 4 Drawing Figures

IN-FEM LIQUID CRYSTAL DISPLAY PANEL WITH A FILM OF CELLOPHANE TAPE

BACKGROUND OF THE INVENTION

The present invention relates to a liquid crystal display panel and, more particularly, to a twisted nematic-field effect mode (referred to as "TN-FEM" hereinafter) liquid crystal display panel.

Conventional TN-FEM liquid crystal display panels comprise a nematic liquid crystal material ($N_p$ type) having a large positive dielectric anisotropy. Molecules of the liquid crystal material are twisted between surfaces of a pair of confronting substrates at substantially right angles by orientation treatment. The liquid crystal material is sandwiched by the confronting substrates to provide a liquid crystal element.

A pair of polarizers are provided for surrounding the liquid crystal element. Rays passing through the liquid crystal element are polarized by the polarizers to provide a specific display. A positive type display is obtained when the polarization axes of the polarizers are orthogonal to each other. A negative type display is obtained when the polarization axes of the polarizers are parallel each other.

Since the polarizers are fixed to the liquid crystal element over the display area, each display is only of either the positive type display; or the negative type display. Both of them can not be selected in the same liquid crystal display cell, conventionally.

SUMMARY OF THE INVENTION

Accordingly, it is an object of the present invention to provide an improved TN-FEM liquid crystal display panel for freely selecting a positive type display or a negative type display.

It is another object of the present invention to provide an improved TN-FEM liquid crystal display panel with a film having a particular optical axis for enabling either of a positive type display and a negative type display to be selected. Briefly described, in accordance with the present invention, a liquid crystal display panel comprises a pair of polarizers, the polarization axes of the polarizers being substantially orthogonal each other, a pair of substrates each supporting an electrode, a film provided between one of the substrates and one of the polarizers, the film having an optical axis inclined to the polarization axis of said one of the polarizers at about 45°, and a liquid crystal material disposed between the substrates, molecules of the liquid crystal material being twisted at about 90° between the surfaces of the substrates.

The panel is adapted to provide a positive type display at the position where the film is not positioned and the panel is adapted to provide a negative type display at the position where the film is positioned.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2-1, 2-2 and 3 show a display pattern provided by the TN-FEM liquid crystal display panel shown in FIG. 1.

DESCRIPTION OF THE INVENTION

Figure 1:
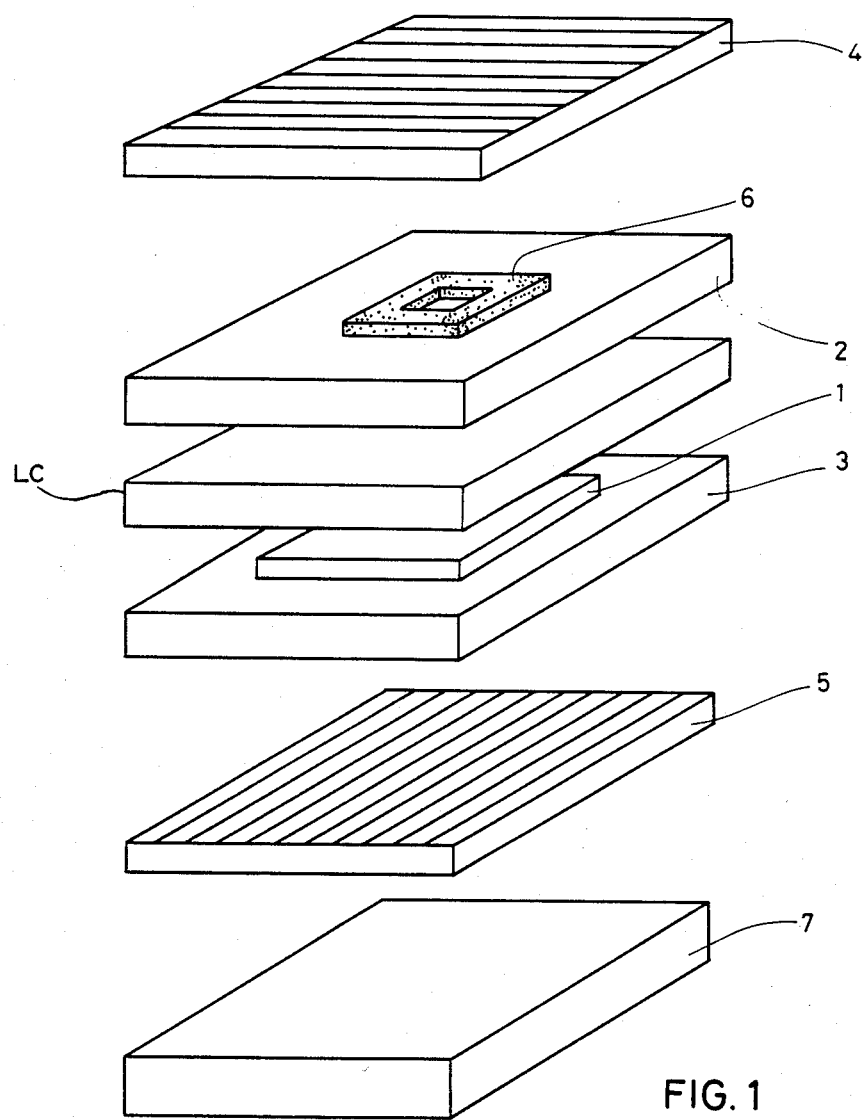
FIG. 1 shows an exploded view of an TN-FEM liquid crystal display panel according to the present invention.

FIG. 1 shows an exploded view of an TN-FEM liquid crystal display panel according to the present invention.

The display panel of FIG. 1 comprises a pair of glass substrates 2 and 3, a pair of polarizers 4 and 5, and a film 6 which is cellophane tape. The display panel contains a nematic liquid crystal material ($N_p$ type) having a large positive dielectric anisotropy. Molecules of the liquid crystal material are twisted at right angles between the glass substrates 2 and 3.

The liquid crystal L C material is sandwiched by the glass substrates 2 and 3. The glass substrates 2 and 3 each support a specifically patterned electrode, for example, a rectangular electrode 1. The polarizers 4 and 5 are positioned to sandwich the glass substrates 2 and 3. The polarization axes of the polarizers 4 and 5 are orthoganal each other. The polarizer 4 is positioned at a display side. The polarizer 5 is positioned at a rear side.

The film 6 is interposed between the glass substrate 2 and the display side polarizer 4. The film 6 has an optical axis which is inclined to the polarization axis of the display side polarizer 4 at about 45°. A light source 7 is positioned behind the display panel.

The polarization axes of the polarizers 4 and 5 are orthogonal each other.

In the absence of an applied voltage to the display panel, incident rays can penetrate through the display panel without any interruption of the incident rays. In the presence of an applied voltage to the display panel, the incident rays are prevented from penetrating at portions corresponding to the positions of the electrodes 1 to which the voltage is applied. This enables a positive type display.

According to the present invention, the film 6 having the particular optical axis is interposed. The polarization angles are turned at about 90° at the position of the film 6 with the help of the birefringence of the film 6. In the absence of an applied voltage to the display panel, the incident rays are prevented from penetrating to thereby provide a dark condition. In the presence of an applied voltage to the display panel, the incident rays can penetrate through the display panel at the portions corresponding to the positions of the electrodes to which the voltage is applied. This enables a negative type display. It is evident that, in place of the film 6 interposed between the glass substrate 2 and the display side polarizer 4, a film may be interposed between the glass substrate 3 and the rear side polarizer 5, the film having an optical axis which is inclined to the polarization axis of the rear side polarizer 5 at about 45°.

Figures 1, 2:
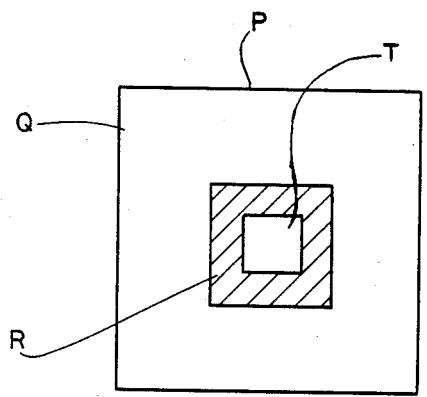
Figure 2:
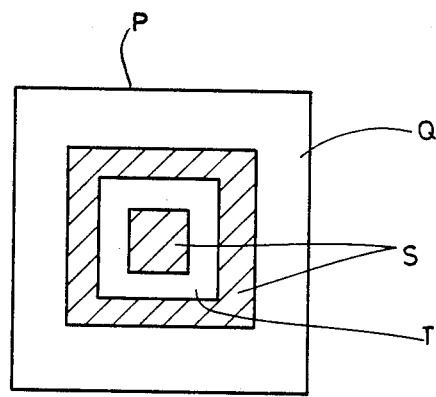

FIGS. 2-1 and 2-2 show examples of a display pattern provided by the display panel of FIG. 1. FIG. 2-1 illustrates the case when an applied voltage to the display panel is absent. FIG. 2-2 illustrates the case when an applied voltage to the display panel is present.

In FIGS. 2-1 and 2-2, P is a display surface of the display panel, Q is a transparent base, R and S are a dark image, and T is a transparent image.

In FIG. 2-1, the dark image R emerges in the transparent base Q. The dark image R is due to the negative type display at the portions of the film 6. In FIG. 2-2, the dark image S emerges in the transparent base Q.

The dark image S is due to the positive type display at the portions to which the film 6 is not positioned. The dark image R in FIG. 2-1 is changed to be the transparent image T at the portions to which the film 6 is positioned. From the absence of the applied voltage to the presence of the applied voltage, the dark image R is changed to be the dark image S.

Figure 3:
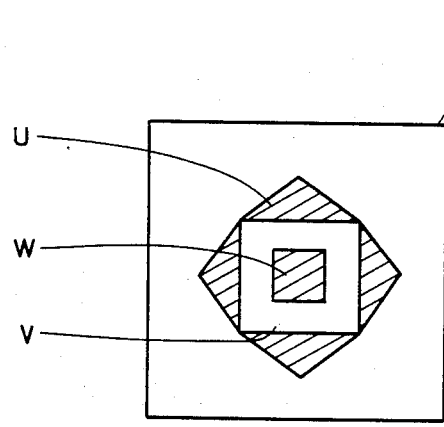

The advantage of the display panel according to the present invention is as follows:

With reference to FIG. 3, dark images U and W are provided and a transparent image V is provided. The transparent image V can be provided by positioning the film according to the present invention.

Conventionally, electrodes must be positioned at the portions corresponding to the images U and W. Leads to the electrodes for the central image W are interrupted by leads to the electrodes for the surrounding image U. It is difficult to arrange the leads to the electrodes for the central image W, conventionally.

According to the present invention, a plurality of films each having a particular optical axis with respect to the polarization axis of the polarizer can be layered to provide a unique display pattern.

A color display can be enabled by coloring the film for the present invention.

The film used for the present invention may be a cellophane tape or the like.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display panel comprising:
   a pair of polarizers, the polarization axes of the polarizers being substantially orthogonal each other;
   a pair of substrates each supporting an electrode;
   a film composed of a cellophane tape provided between one of the substrates and one of the polarizers, the film having an optical axis inclined to the polarization axis of said one of the polarizers at about 45°; and
   a liquid crystal material disposed between the substrates, molecules of the liquid crystal material being twisted at about 90° between the surfaces of the substrates.

2. The panel of claim 1, wherein the panel is adapted to provide a positive type display at the position where the film is not positioned and the panel is adapted to provide a negative type display at the position where the film is positioned.

* * * * *